Sept. 24, 1940. C. A. LANG 2,216,036
INDICATING MECHANISM
Original Filed April 25, 1938 2 Sheets-Sheet 1
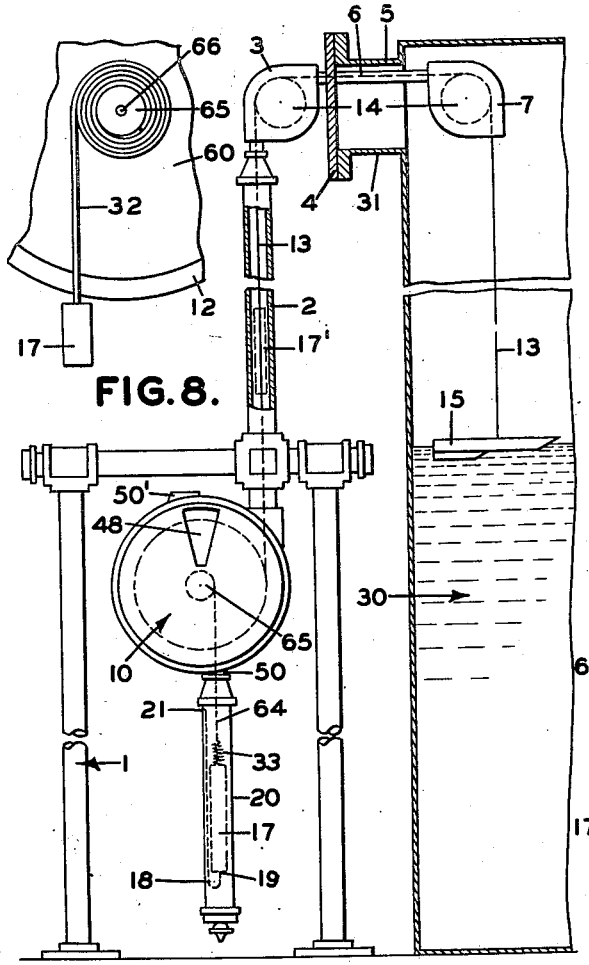
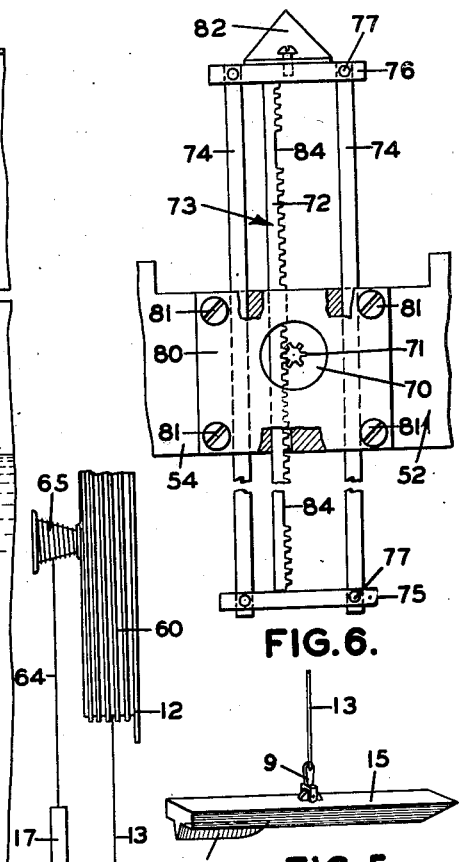
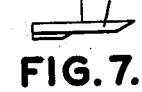
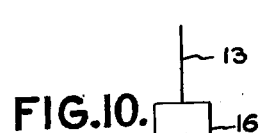
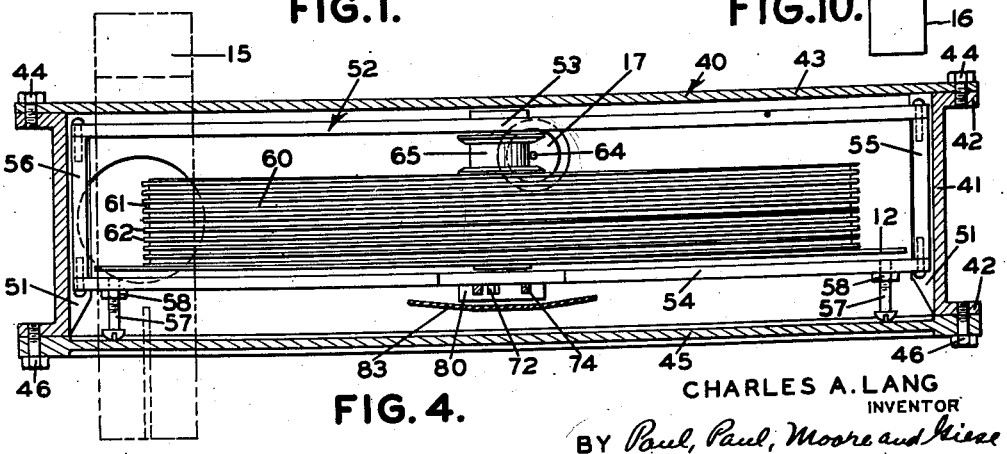
CHARLES A. LANG
INVENTOR
BY Paul, Paul, Moore and Kiese
ATTORNEYS

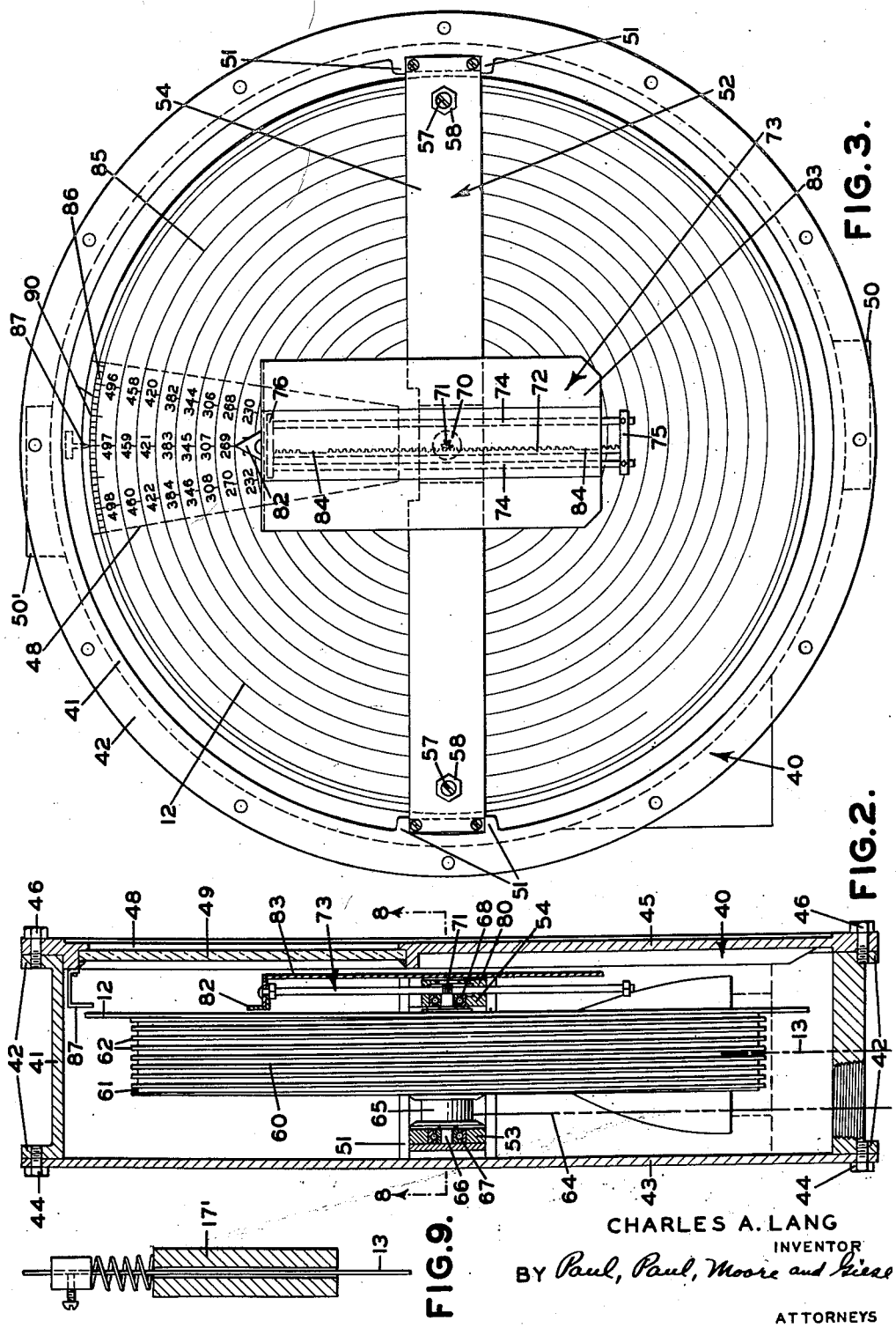

Patented Sept. 24, 1940

2,216,036

UNITED STATES PATENT OFFICE 2,216,036

INDICATING MECHANISM

Charles A. Lang, Minneapolis, Minn., assignor to Langage, Inc., Minneapolis, Minn., a corporation of Minnesota Original application April 25, 1938, Serial No. 204,073. Divided and this application February 23, 1939, Serial No. 257,937

3 Claims. (Cl. 116—129)

The present invention relates to an indicating mechanism for measuring position, levels, or distances. The device herein illustrated is useful for a variety of purposes but for purposes of illustration (without any intention of limiting its usefulness) the device is described as a liquid level indicating mechanism, and in such use it is capable of indicating relatively minute changes in the level of liquid in reservoirs in which the level varies over a wide range, such as reservoirs for the bulk storage of oil. Such reservoirs or "tanks," as they are commonly designated, are frequently more than 100 feet in diameter and upwardly of 100 feet in height. Due to the large surface areas of such tanks very minute changes in the level of the oil therein represent sizeable quantities of liquid. For example, in an eighty thousand barrel capacity tank having a diameter of 120 feet and a height of 42 feet, each one-tenth inch of height represents 666 gallons, or almost sixteen barrels capacity. It has heretofore been considered impossible to measure liquid level of such tanks to within less than one-quarter of one inch and as a result the handling of liquids such as oil in bulk storage has been fraught with inaccuracies frequently totaling many thousands of barrels. Since the purchasing of oil is frequently based upon tank measurements such large discrepancies have resulted in mispayments totaling many hundreds of dollars.

It is an object of the present invention to provide an indicating device which is capable of accurately indicating changes of distance or position, such as changes in liquid level, in the order and magnitude of one-one hundredth ($\frac{1}{100}$) inch over scale ranges from a few feet to more than one hundred feet.

It is also an object of the invention to provide an indicator having a scale length which is of the same order and magnitude as the range of distances or positions measured.

It is also an object of the invention to provide a distance level or position indicator having a fine scale for accurate reading and a large easily discernable indicator for distant reading, together with a scale of fractional units of the same or enlarged length as compared with the actual measurements indicated.

In the transportation of oil and other fluids by pipe lines it is customary to provide pumping stations along the pipe line at intervals of from 20 to 30 miles. Each pumping station is ordinarily provided with a "tank farm" comprising a large number of oil storage tanks for the temporary or permanent storage of oil. During the pumping of oil into and out of storage, accurate measurements of liquid level in the tanks must constantly be made and communicated to the pump operator so as to prevent loss due to over filling and what is even more important, to prevent air being taken into the pipe line, since an air slug between columns of oil in the pipe line constitutes a possibility of "hydraulic hammering" of the oil in the line.

It has heretofore been customary to measure the liquid level in the "tank farm" by manual means such as by a tape or line, but this method has not been wholly satisfactory because (1) it is not a continuous measurement, (2) it is not an accurate measurement, and (3) because the measurement taken at any one tank had to be transmitted manually or by signaling means to a remote pump control room.

It is an object of the present invention to provide liquid level indicating means for "tank farms", refineries and the like, whereby a continuous liquid level indication may be provided in the tanks individually and also provided at a remote place such as the pump control room of a pipe line pump station, or to the process units in an oil refinery.

It is a further object of the invention to provide a liquid level indicating device which is very rapidly responsive to changes in liquid level and one which gives continuous accurate indications of the liquid level in the tank.

The handling of liquids such as oil into and out of bulk storage tanks frequently produces movements in the liquid which tend to move the responsive elements, and it has heretofore been customary to provide guides or braces to prevent such movement. The friction between such guides or braces and responsive member rendered such devices inaccurate. Furthermore, any guide or brace within a tank is totally unacceptable for practical use because of the high cost of installation and the possibility of derangement in service.

In the present apparatus a freely suspended displacement member is provided, said member being of a shape such that it will be relatively little affected by surface movements of liquids by which it is buoyed up. In some instances it is desirable to make the displacement member of a material having a specific gravity higher than the liquid being measured, and to make it of a size and shape such that it may be inserted through any small hole that may be available in a tank on which the unit may be mounted. In some instances it is also desirable to provide a weighted displacement member and counter-balancing system for actuating the indicator mechanism, and to provide primary and secondary counter-balancing members in the indicator actuating mechanism.

It is a particular object of the present invention to provide a direct-acting, low-energy, low-inertia indicator capable of being actuated by an indicator actuator mechanism which is capable of developing only a small amount of energy. By suitably proportioning the indicator and actuating system, I am able to provide a mechanism which is capable of rapidly responding to changes impressed upon it.

It is also an object of the invention to provide an indicator which is adapted to be used in an indicator actuator system in which the liquid displacement member is counterbalanced and in which the interconnection between the indicator and counter-balance is through a resilient member so as to provide an oscillatory system. The effect of static friction and inertia are minimized in part by this arrangement and the indicator instrument accordingly responds to even slight variations in liquid level.

It is a further object of the invention to provide an indicator which is adapted for use in a completely balanced liquid level indicator system in which the weight of the translatable and rotative parts are continuously in balance.

It is a further and specific object of the invention to provide a liquid level gauge unit in which the indicating element comprises a dial having a spiral scale thereon, the extended length of which is of the same order and magnitude as the actual operating range of the instrument, and it is a further object of the invention to provide a plurality of indicia for cooperation with said dial to indicate (1) a rough approximation of the liquid level (2) unit variations of the liquid level, and (3) fractions of unit variations.

It is a further object of the invention to provide an indicator mechanism in which fractions of units are indicated upon an enlarged scale, without the use of gearing for such enlarged scale reading.

Other and further objects of the invention are those inherent in the devices and mechanisms hereinafter described, claimed in and illustrated, and those implied by the description, claims, and by the illustrations.

The invention is illustrated with reference to the drawings in which

Figure 1 is a schematic drawing illustrating one manner of applying the indicating instrument to a liquid storage tank.

Figure 2 is a side elevation partly in section, illustrating a preferred modification of a direct reading indicating instrument.

Figure 3 is a front elevation partly broken away of the indicating face of the indicating instrument shown in Figures 2 and 4.

Figure 4 is a plan view partly in section, along the line 8—8 of Figure 2.

Figure 5 is an enlarged view of a preferred form of displacement member.

Figure 6 is an enlargement partly broken away of a portion of the indicating mechanism.

Figure 7 is a schematic partial view in elevation showing a modified form of the counter-weight mechanism.

Figure 8 is a schematic partial view in elevation showing a second modification of the counter-weight mechanism.

Figure 9 is a detail partly in section, showing a modified form of connection between the operating wire and direct counter-balance. Figure 10 shows an ordinary cylindrical, displacement member.

The present application is a division of my co-pending application Serial Number 204,073 filed April 25, 1938.

A general layout of a liquid level indicating system of the type in which the indicating mechanism of the present invention is adapted to be used is shown in Figure 1 of the drawings in which the liquid level gauge is illustrated generally at 10. In Figure 1 the indicating instrument or "gauge" is illustrated as being mounted at ground level adjacent an oil tank generally designated 30 although it is to be understood that various modifications in the mounting and location of the instrument may be made as desired to accommodate the particular type of tank on which the instrument is installed. In Figure 1 the tank is of the "balloon roof" type and is provided with a side connection 31 through which the pulley apparatus is inserted. The body of the indicator 10 is supported by a framework of pipes, generally designated 1, but it may obviously be supported in any other desired manner. Extending upwardly from the framework and body 10 is a conduit 2 which terminates at a pulley housing 3 outside cover plate 4 on tank connection 5. Another conduit 6 passes through the cover plate 4 and is welded or otherwise mounted in pressure-tight relation on the plate. Inside the tank the conduit 6 terminates in a pulley housing 7 which is sufficiently small that it can be passed through tank connection 5. Other methods of mounting these conduits on the tank may obviously be used as conditions necessitate.

In general the indicating instrument, or "gauge" consists of an indicating dial 12 which is directly operated by a float wire 13 which runs from the instrument up through the conduit 2 and over idler pulleys 14 in housings 3 and 7 to the displacement member 15 within the tank. The idler pulleys are of light weight metal, and are mounted on precision type ball-bearings, not illustrated.

The displacement member is illustrated in Figure 1 as being a boat-shaped object and this is the preferred form although as hereinafter explained, in installations where the surface of the liquid is extremely quiet an ordinary cylindrical displacement member may be used, as illustrated in Figure 10.

The indicating instrument of "gauge" 10 is provided with a counter-weight generally designated 17, supported by cable 64 which moves proportionately to the movement of the float. Thus, when the float is in a low liquid level position the counter-weight will be at its highest position, and when the liquid level and float 15 are at the high liquid level position the counter-weight 17 will be at its lowest position.

As illustrated at Figure 1 the counter-weight is housed in tube 20 which is attached to boss 50 of the instrument. The counter-weight casing is capped at the bottom end and may, if desired, be provided with a petcock for draining any condensate which may collect. The instrument housing, the conduit by which it is connected to the tank 30, and the counter-weight housing all form a closed system in which the mechanical elements of the system operate. The escape of vapors from the tank is thus prevented.

The counter-weight is provided with a loop chain 18 which is connected to the counter-weight at 19 and to the counter-weight casing at point 21. As the counter-weight 17 is raised it serves to support an increasing amount of chain 18 and as it is lowered the counter-weight supports less of the chain. The weight of the chain supported by the counter-weight in its uppermost position is equal to the weight of the displacement member wire 13 between the low and high positions, and the counter-weight chain 18 thus serves to compensate for the additional weight of the displacement member wire 13 when the float is in the low liquid level position. This compensation device is important in some conditions as will be be explained in greater detail hereinafter.

The indicating instrument of the present invention is the direct mechanical drive type and is illustrated particularly in Figures 1, 2, 3 and 4. The instrument casing generally designated 40 consists of an annular ring 41 having edge flanges 42. A back plate 43 is bolted to the annular ring 41 by a plurality of bolts 44, and a front plate 45 is likewise fastened to the ring 41 by a plurality of bolts 46. The front plate is provided with an opening 48 (Figure 1) which is covered by a glass 49. The glass is preferably fitted in pressure-tight relation to the front plate 45. The opening 48 has the shape shown in the full lines in Figure 1 (also shown by the dotted lines in Figure 3) and serves to expose a portion of indicating dial 12.

The inner surface of annular ring 41 of the housing is provided at each side with a pair of supporting lugs 51 which constitute a channel for the reception of the mechanism frame, generally designated 52. The mechanism frame is comprised of a back cross-bar 53 and a front cross-bar 54 connected together and maintained in spaced relation by spacer bars 55 and 56. The spacer bars have substantially the same width as the space between supporting lugs 51 on the inside of the annular housing 41 and hence the mechanism frame can easily be moved into the instrument during assembly. The front cross-bar 54 is provided with a pair of spacer screws 57 which are threaded into the bar and provided with lock nuts 58 by which they are prevented from turning. These spacer screws 57 locate the instrument in definitely spaced relation to the front plate 45.

The indicating mechanism is supported by the mechanism frame and comprises a drum 60 on which the displacement member wire 13 is adapted to be wound, and a much smaller drum 65 on which the counter-weight supporting member 64 is adapted to be wound. Drums 60 and 65 are carried by shaft 66 which is mounted in antifriction ball bearings 67 and 68. Bearing 67 is mounted on back cross-bar 53 and bearing 68 is mounted on front cross-bar 54.

The indicating dial 12 and drums 60 and 65 are all mounted directly on the shaft 66 and dial 12 is accordingly moved with the drums as they are revolved due to changes in liquid level position. The drum 60 is provided with a groove 61 in the manner of a screw thread so that as the displacement member supporting wire 13 is taken in it will be wound in an even course across the face of the drum. In some instances the groove 61 may be dispensed with and a smooth drum used instead. The shoulders 62 between adjacent thread grooves 61 are spaced apart by a distance which is slightly greater than the diameter of the displacement member supporting wire 13 so that there is a minimum of friction between the wire and the drum as it is wound thereon.

The front cross bar 54 is provided with a central aperture 70, as shown in Figure 3, through which extends the stub end of instrument shaft 66. The end of the shaft is formed with gear teeth 71 which cooperate with a rack bar 72 on the instrument flag and pointer mechanism, generally designated 73.

Figure 6 shows an enlarged view of the instrument flag and pointer mechanism except with the flag 83 removed. This mechanism comprises a pair of vertically spaced bars 74 and the rack bar 72. The bars 74 are connected together in parallel spaced relationship by a bottom cross-bar 75 and a top cross-bar 76. The cross-bars may be fastened to the vertical bars 74—74 in any desired manner as by rivets 77. It will be noted that rack bar 72 is not fastened to the cross-bars but is merely positioned so as to be moved up and down by them. This method of mounting permits the bar 72 to assume the best operating position with respect to the pinion 71.

Front cross-bar 54 of the instrument-carrying frame is provided with a slide block 80 which is attached to the instrument frame by screws 81 (see Figure 6). The slide block 80 is provided with three grooves to receive the vertical bars 74 and the rack bar 72, the grooves being of sufficient width and depth to accommodate the bars without binding when the slide block 80 and the mechanism are assembled on the instrument cross-bar 54. The top cross-bar of the flag and pointer mechanism carries an index pointer 82 and a flag 83 which is fastened so as to hang vertically in spaced relation to the index mechanism when assembled on the instrument cross-bar 54, as shown in Figures 2 and 4. The line of lift of the gear teeth of pinion 71 is through substantially the center of gravity of the flag and pointer mechanism. The mechanism is hence practically balanced on the gear teeth and there is accordingly a minimum amount of friction upon the grooves of slide block 80.

The rack bar is provided with upper and lower blank spaces 84—84 which define the limit of movement of the flag and pointer mechanism 73. These blank spaces in the rack bar serve to prevent the flag and pointer mechanism from being harmed if the drum is revolved beyond its normal limit of movement by excessive turning of the drum, as may occur during installation.

The indicating dial 12 is provided with a spiral marking 85 which is the line defined by the index pointer 82 upon the dial as the dial and pointer mechanism move from the low liquid level position to the high liquid level position. The indicating dial is also provided with a circle 86 of fractional indicia adjacent which there is mounted a pointer 87. Pointer 87 may for convenience, be attached to the front housing plate 45, as herein illustrated. It will be noted that the circle 86 of fractional indicia has a greater diameter than the drum 60 and hence the actual distances between adjacent fractional indicia marks on the circle 86 are greater than the increments of liquid level change which they may represent. This feature permits an exceedingly accurate reading of the instrument.

Typical dial graduations are shown on Figure 3 as they appear through opening 48 in front housing plate 45. Although Figure 3 is a view with the front cover removed, all of the dial markings except those just mentioned have been omitted so as to avoid confusion of the drawings.

The instrument provides three indications of liquid level, as follows:

*First.*—The flag 83 which operates behind window 48 of the housing serves as a general indication of the liquid level. The flag 83 is preferably painted a distinct color such as Chinese red, whereas the instrument is generally painted with aluminum pigmented paint, and the position of the flag 83 behind the opening is, therefore, clearly visible at a considerable distance and serves to denote generally whether the liquid level is low or about medium full, or full.

*Second.*—The pointer 82 which moves in juxtaposition to the spiral 85 of unit indicia affords a fine unit graduation of the liquid levels being measured. The total length of the spiral 85 is of substantially the same order and magnitude as the distance the displacement member moves from low level to high level condition, for the turns which are of larger diameter than the drum compensate for the turns which are of smaller diameter. Thus, by noting the position of pointer 82 over the unit indicia of spiral 85 there is obtained accurate readings in units of the liquid level being measured.

*Third.*—The pointer 87 which operates in juxtaposition to the circle 86 of fractional indicia in conjunction with pointer 82 affords a decimal reading of the liquid level. The distances between consecutive radial lines 90 at the diameter 86 is preferably divided into ten spaces and thus the pointer 87 and dial 86 afford a reading in tenths of the unit reading afforded by pointer 82. Since the distance along the circumference of circle 86 between the radii of successive units is greater than the change in liquid level actually being measured, the accuracy of the instrument is considerably enhanced. Readings of the order and magnitude of 1/100 of an inch of liquid level change can be made upon a dial of approximately twelve inches in diameter when the instrument is directly connected to a displacement member, and this degree of accuracy is maintained throughout the entire range of liquid level change, which may be from a few feet to more than one hundred feet. This feature of accuracy results from the combination of the gearless concentric driving mechanism with the concentric indicating mechanism. By this combination the motion of the displacement member is transmitted as a unit function through the mechanical driving mechanism, and is repeated as substantially a unit function in the indicator side of the instrument.

As shown in Figure 1 the gauging instrument 10 is mounted to be operated by the displacement member wire 13 which is strung vertically above the instrument to pulleys 14—14 to the displacement member 15 within the tank 30. The instrument 10 is also provided with a second boss 50' on the annular ring member 41 of the housing. As shown in Figure 1 the counter-weight casing is connected to boss 50; the other boss 50' being plugged. If desired the annular ring portion 41 of the housing may be placed in a position 180 degrees rotated from that shown in Figure 1, when it is desired to have the wire 13 lead directly downward to the displacement member 15 of a tank. When thus oriented the whole instrument would be located directly over the tank being gauged.

Displacement member 15 of Figure 1, which is illustrated in detail in Figure 5 comprises a boat-shaped object which is preferably composed of metal having a specific gravity greater than the specific gravity of the liquid being gauged. The member 15 is provided with a pivoted coupling 9 by which it is attached to the wire 13. The base of the displacement member is provided with a keel-like protuberance 8 at one end and the opposite end is shaped so that the member 15 will have a minimum resistance to the flow of liquids about it. The position of pivoted coupling 9 on the displacement member is such that the member will remain substantially level when suspended in the liquid. Other shapes of the displacement member may obviously be used, the criterion being to choose a shape and balance which reduces the head resistance of the member to a fluid flowing about it.

Figures 1 and 5 show the suspension member 13 attached by swiveled connection 9 to the displacement member 15 at a point permitting the major part of the transverse projected submerged area of the displacement member 15 to come at the left of the suspension member attachment 9. In other words, in referring to the suspension member 13, as a vertical axis about which the displacement member 15 may rotate, unbalanced areas of the displacement member 15 are presented to the action of currents or motion of the liquid in which it is suspended.

The weight of counter-balance 17 produces a torque upon the drum 60 of the instrument which in part supports the displacement member 15, the remaining support of the member being supplied by the buoyant force of the liquid about it. The weight of the displacement member 15 upon wire 13 is sufficient to keep the wire 13 substantially vertical and the shape of member 15 is such that it will be headed into the stream flow of the liquid in the tank, if flow should occur. The combined effect of the weight of the displacement member 15 which keeps the wire 13 substantially vertical, and its shape, obviates the necessity of guides within the tank even though the liquid may move past the member 15 with fair velocity. Currents are set up during the filling or emptying of tanks and convection currents practically always exist due to heating and cooling of the tank with daily temperature changes. The liquid level measuring device of the present invention is thus capable of accurately measuring the level even during filling and emptying of the tank. This is not possible when the displacement member is guided upon rods and wires since side forces of the displacement member sets up frictional forces on the guides, which seriously impair the sensitivity of such instruments.

When a displacement member is used which has a greater specific gravity than that of the liquid in which it operates, the system is self-compensating and self-indicative of derangement. In float type displacement members a leaky float may still operate but the actuation of the instrument will be inaccurate and insensitive. No such trouble can be encountered with the preferred displacement member of this invention. If incrustation of the displacement member with substances having a specific gravity greater than the liquid should occur to an extent sufficient to overweight the displacement member it will sink and by the limiting indication, "Empty," suggest derangement. Similarly, if the wire 13 should break the instrument will indicate "Full" and likewise suggest derangement, since the limiting conditions are not usual.

For installation in exceptionally quiet tanks it is sometimes permissible to provide a float-type displacement member, that is to say, one having a lesser weight than buoyance. Such floats which may be shaped so as to be freely movable to resist any slight currents occurring in the tank or may be shaped in the form of a cylinder, as shown in the dotted lines in Figure 1 when the liquid is viscid and immobile.

Figure 7 illustrates a modification of the winding drum in which the weight of the suspension wire 13 is compensated by a variable diameter of the winding drum 65 of the counter-weight. In this modification the winding drum for the suspension wire 13 of displacement member 15 is of constant diameter, whereas the winding drum 65 for the suspension cable of counter-weight 17 is shaped so that the winding radius increases as the counter-weight 17 is lifted. The restoring torque thus produced by the counter-weight increases as an increased length of cable 13 is unwound.

Figure 8 illustrates a second modification of the counter-weight winding mechanism. In this instance the counter-weight 17 is suspended by a tape 32 which winds upon itself as the counter-weight is raised. The thickness of tape 32 thus increases the winding radius of the counter-weight drum 65 as each additional turn is made, with the result that as the counter-weight is raised an increasing restoring torque is produced upon shaft 66.

Where the suspension wire 13 is relatively fine and the total weight of the displacement member 15 is large the effect of the weight of the suspension wire is negligible and the compensating arrangements of Figures 1, 7 and 8 may permissibly be disregarded, but for displacement members of comparatively small weight, and for deep tanks particularly, the counter-weight compensation is desirable.

In some instances it is desirable to load the displacement member 15 with high specific gravity metal, or to make it especially heavy, so as to increase the vertical stability of the suspension member 13. When this increased weight reaches the permissible maximum of the instrument bearing loading it may be directly counter-balanced by attaching a weight, 17' to the portion of wire 13 within tube 2 of the conduit. A portion of the displacement member weight is thus taken by the bearing of pulleys 14—14, which are preferably anti-friction ball bearings of the type used in the instrument.

It is preferable to interpose a spring 33 between the counter-weight supporting cable and the counter-weight 17 within housing 20. This has the desirable effect of reducing the total mass of the units solidly interconnected in the system, and enables the displacement member 15, the attached wire 13, drum 60 and dial 12 to respond to a slight rapid liquid level change without at the same time initially moving counter-weight 17 which has a large mass. The instrument is thus responsive to slight "shock" disturbances of minute character such as ripples and by moving in response to such slight disturbances is apparently put in a dynamic state which enables it more readily to respond to slow changes of small magnitude of the average liquid level. Where a direct counter-balance is used within conduit 2, this may also for a similar reason be attached to the wire 13 through a spring suspension, as shown in the detail Figure 9.

The herein described indicator mechanism is useful wherever it is desired to indicate position, level, or distance, but has especial utility in the liquid level indicating system illustrated, and to other analogous systems, as for example in the pressure and corrosion resistant indicator system or the telemetric indicator system illustrated in my co-pending application Serial Number 204,073, filed April 25, 1938, of which this application is a division.

Many obvious variations may be made in the apparatus and system herein described and illustrated without departing from the spirit of the invention claimed.

I claim:

1. An indicator mechanism comprising a horizontal shaft rotatable through a number of turns, a dial mounted for rotation in a vertical plane with said shaft and through a corresponding number of turns, spirally arranged indicia on said dial, the number of spiral turns corresponding to the number of turns of the shaft and dial, pointer means, means mounting said pointer means for movement radially with respect to said dial and along a vertical path, drive means connecting said dial and pointer means for moving said pointer means in juxtaposition to said spiral of indicia as the dial is rotated from one extreme position to another extreme position, a second circumferential series of indicia on said dial, said second series being graduated in fractions of the unit changes on said spiral, and a stationary pointer mounted on said mechanism in juxtaposition to said circumferentially arranged indicia and in line with the radial line of movement of said radially movable pointer means.

2. An indicator mechanism comprising a horizontal shaft rotatable through a number of turns, a dial mounted for rotation in a vertical plane with said shaft through a corresponding number of turns, spirally arranged indicia on said dial, the number of spiral turns corresponding to the number of turns of the dial from one extreme position to another extreme position, pointer means, means mounting said pointer means for movement radially of said dial along a vertical path, drive means connected with said dial and said pointer means for moving said pointer means in juxtaposition to said spiral indicia as the dial is rotated from one extreme position to the other extreme position, a housing for said indicator mechanism, said housing having an opening aligned with said path of movement of the radially movable pointer means, and a mask mounted for movement with said radially movable pointer so as to be drawn across said opening of the housing as the pointer moves from one extreme position to the other extreme position.

3. An indicator mechanism comprising a horizontal shaft rotatable through a number of turns from one extreme position to another extreme position, a vertically oriented dial indicator means mounted for rotation with said shaft through a corresponding number of turns, spirally arranged indicia on said dial means, the number of turns corresponding to the number of turns of the dial means from one extreme position to the other extreme position, pointer means mounted for movement radially of said dial means along a vertical path, drive means connecting said dial and pointer means for moving said pointer means in juxtaposition to said spiral of indicia as the dial means is rotated from one extreme position to the other extreme position, a second series of indicia arranged circumferentially on said dial means and said circumferential indicia being graduated in fractions of the unit change represented by one turn of said spiral of indicia, a stationary pointer mounted on said mechanism in juxtaposition to said circumferentially arranged indicia and in line with said radial line of movement of said radially moveable pointer means, a housing for said indicator, said housing having an opening aligned with said line of movement of the radial pointer means and a mask mounted for movement with said radially movable pointer means behind said opening so as to be drawn across said opening as the pointer means moves from one extreme position to the other extreme position.

CHARLES A. LANG.